US006753543B2

(12) United States Patent
Yanagita et al.

(10) Patent No.: US 6,753,543 B2
(45) Date of Patent: Jun. 22, 2004

(54) RADIATION IMAGE CONVERSION PANEL

(75) Inventors: Takafumi Yanagita, Tokyo (JP); Nobuhiko Takashima, Tokyo (JP)

(73) Assignee: Konica Corporation, Tokyo (JP)

( * ) Notice: Subject to any disclaimer, the term of this patent is extended or adjusted under 35 U.S.C. 154(b) by 77 days.

(21) Appl. No.: 10/098,668

(22) Filed: Mar. 15, 2002

(65) Prior Publication Data

US 2002/0195578 A1 Dec. 26, 2002

(30) Foreign Application Priority Data

Apr. 2, 2001 (JP) ....................................... 2001-103095
May 24, 2001 (JP) ....................................... 2001-155182

(51) Int. Cl.[7] ................................................ C09K 11/61
(52) U.S. Cl. ........................................ 250/581; 250/582
(58) Field of Search ................................. 250/581, 582, 250/483.1, 483.2, 484.3, 484.4; 430/139

(56) References Cited

U.S. PATENT DOCUMENTS 4,962,578 A * 10/1990 Saito et al. ................... 492/53
5,237,915 A * 8/1993 Rounsley ................ 100/162 R
5,877,504 A * 3/1999 Yanagita et al. ......... 250/484.4
5,888,647 A * 3/1999 Yamane ...................... 428/338
5,952,666 A * 9/1999 Nakano et al. .......... 250/484.4
6,262,424 B1 * 7/2001 Yanagita et al. ......... 250/483.1
6,531,073 B1 * 3/2003 Wakamatsu et al. . 252/301.4 H

* cited by examiner

*Primary Examiner*—Constantine Hannaher
*Assistant Examiner*—Otilia Gabor
(74) *Attorney, Agent, or Firm*—Frishauf, Holtz, Goodman & Chick, P.C.

(57) ABSTRACT

A method for preparing a radiation image conversion panel, which comprises the steps of:

(a) applying onto a support a stimulable phosphor coating composition comprising a stimulable phosphor and a polymer resin to form a stimulable phosphor layer;
(b) drying the stimulable phosphor layer; and
(c) subjecting the stimulable phosphor layer on the support to a compression treatment employing a calender roller which comes into contact with the stimulable phosphor layer to form the radiation image conversion panel, wherein the calender roller comprises a resin and the surface of the calendar roller has a Shore D hardness of D80 to D97°.

9 Claims, 1 Drawing Sheet

RADIATION IMAGE CONVERSION PANEL

FIELD OF THE INVENTION

The present invention relates to a radiation image conversion panel employing stimulable phosphors, and an image formation method using the panel. Specifically the present invention relates to a radiation image conversion panel which results in excellent balance between the emission luminance and the sharpness of said stimulable phosphors.

BACKGROUND OF THE INVENTION

Radiation images such as X-ray images are widely employed for medical diagnoses. Utilized as a method for obtaining X-ray images is so-called radiography in which X-rays, which have passed through an object, are subjected to irradiation onto a phosphor layer (being a fluorescent screen) to result in visible light, which is irradiated onto a silver salt bearing film, in the same manner as conventional photography, and the resulting film is subjected to photographic processing.

In recent years, however, a method has been invented in which images are formed directly from a phosphor layer instead of an image formation method employing a silver salts photographic film.

This method comprises the steps of (1) making absorbing the radiation energy which passes through the object to the phosphor; and (2) stimulating the phosphor with light or heat so that radiation energy stored in said stimulable phosphor layer is released as stimulated luminescence. (3) forming images after detecting the released energy.

Said method is described, for example, in U.S. Pat. No. 3,859,527 and Japanese Patent Publication Open to Public Inspection No. 55-12144. A radiation image conversion panel comprised of stimulable phosphors is disclosed in them.

This method uses a radiation image conversion panel and the stimulable phosphor layer of said radiation image conversion panel is subjected to radiation exposure which passes through the object being diagnosed so that radiation energy is stored corresponding to the radiation transmittance of each portion of said object. Subsequently, the resulting stimulable phosphor layer is sequentially subjected to stimulation employing electromagnetic waves (stimulating light), such as visible light and infrared rays, so that radiation energy stored in said stimulable phosphor layer is released as stimulated luminescence. Signals of the intensity variation of said stimulated luminescence are subjected, for example, to photoelectric conversion to obtain electrical signals. The resulting electrical signals are employed to reproduce visible images on recording materials such as light-sensitive films or display devices such as a CRT.

The above-mentioned image reproducing method has an advantage of using much less amount of radiation exposure compared with the conventional radiography using a combination of an intensifying screen and a conventional radiographic film. It is possible to obtain radiation images with ample information.

The stimulable phosphors employed in said radiation image conversion panel are those which result in stimulated luminescence after having been subjected to irradiation of stimulating light after said radiation. In practice, phosphors are commonly employed which result in stimulated luminescence in the wavelength range of 300 to 500 nm utilizing stimulating light in the wavelength region of 400 to 900 nm.

The radiation image conversion panel, employing said stimulable phosphors, stores radiation image information and releases stored energy through stimulating light scanning. Therefore, after scanning, it is possible to repeatedly store radiation images so as to be used repeatedly. Further, contrary to the fact that in the conventional radiography, radiographic film is consumed for every exposure, said radiation image conversion method is more advantageous from the viewpoint of resource conservation as well as economic efficiency, because it is possible to repeatedly utilize said radiation image conversion panel.

Relative advantages of radiation image conversion systems employing a radiation image conversion panel vary to large extent depending on the luminance (occasionally called sensitivity) of stimulated luminescence, as well as the image quality represented by the resultant graininess and sharpness, and these characteristics vary widely depending on characteristics of used stimulable phosphors and the configuration of the stimulable phosphor layer. In more detail, the luminescence intensity of the radiation image conversion panel, the sharpness of images, and the granularity vary depending on the size of phosphor particles, the dispersibility of said phosphors, the uniformity of phosphors, and the phosphor filling ratio. Among those, the phosphor filling ratio results in pronounced effects.

As a means to enhance said filling ratio, Japanese Patent Publication Open to Public Inspection No. 3-21893 discloses a radiation image conversion panel having a stimulable phosphor filling ratio of at least 70 percent, while employing a resin having a glass transition temperature (hereinafter occasionally referred to as Tg) of 30 to 150° C., and as an achieving means, discloses the compression of a phosphor layer (hereinafter referred simply to as a coating). The radiation image conversion panel, when employed, is slid with films as well as rollers. As a result, it is assumed that the Tg of employed binder resins is preferably at least 30° C. However, when resins having a relatively high Tg are employed as a binder resin, it becomes difficult to increase said filling ratio due to the fact that the resulting coating is not easily deformed. Further, when the finished coating is compressed, phosphors are subjected to loading due to poor softening properties of said resin, whereby light emission is degraded due to the destruction of the crystal structure of the luminous body. Further, in order to soften said resins, it is necessary to increase the compression temperature. As a result, problems have occurred in which manufacturability is degraded.

Further, Japanese Patent Publication Open to Public Inspection No. 4-44719 discloses a method to enhance the filling ratio of a phosphor layer utilizing a compression treatment. However, said patent publication does not describe any material in regard to the roller employed for said compression treatment. When simply passed between heating rollers, it was found that compression was insufficient and the phosphor was damaged. Further, said patent publication presents no suggestion in regard to the shape of the roller used. On the other hand, it was found that in the compression treatment employing a linear-shaped calender roller, said calender roller tended to warp resulting in unevenness of the compression ratio of the phosphor layer. Said unevenness induces an unevenness of the thickness of the phosphor layer, which results in sharpness fluctuation as well as granulated unevenness of the radiation image conversion panel. As a result, prompt improvement has been demanded.

In the aforesaid patent, the condition is that the temperature during heat compression is more than or equal to the Tg of a resin. For example, the condition such as 80° C., 100° C., or the like, is described. The temperature more than or equal to the Tg of said resin, as described herein, is 69° C., which is the Tg of polyethylene terephthalate film employed widely as a support, or more than that. When a compression treatment is carried out at a temperature more than or equal to the Tg of such a support, problems occur in which said support is deformed and finally the stimulable phosphor plate is also deformed. Particularly, the deformed plate results in unevenness of luminance and sharpness during reading of images, and further results in critical problems with diagnosis. As a result, rapid improvement of these problems has been demanded.

From the view of the foregoing, the present invention has been achieved. An object of the present invention is to provide a radiation image conversion panel which exhibit an excellent balance of luminance and sharpness, and in addition, minimal sharpness fluctuation, a production method thereof, and a radiation image capturing method using the same.

SUMMARY OF THE INVENTION

Said object of the present invention was achieved employing the embodiments described below.

(1) A method for preparing a radiation image conversion panel, which comprises the steps of:

(a) applying onto a support a stimulable phosphor coating composition comprising a stimulable phosphor and a polymer resin to form a stimulable phosphor layer;

(b) drying the stimulable phosphor layer; and (c) subjecting the stimulable phosphor layer on the support to a compression treatment employing a calender roller which comes into contact with the stimulable phosphor layer to form the radiation image conversion panel, wherein the calender roller comprises a resin and the surface of the calender roller has a Shore D hardness of D80 to D97°.

(2) A method for preparing a radiation image conversion panel, which comprises the steps of:

(a) applying onto a support a stimulable phosphor coating composition comprising a stimulable phosphor and a polymer resin to form a stimulable phosphor layer;

(b) drying the stimulable phosphor layer; and (c) subjecting the stimulable phosphor layer on the support to a compression treatment employing a calender roller which comes into contact with the stimulable phosphor layer to form the radiation image conversion panel, wherein the calender roller has a crown value of 10 to 1,000 $\mu$m.

(3) A method for preparing a radiation image conversion panel, which comprises the steps of:

(a) applying onto a support a stimulable phosphor coating composition comprising a stimulable phosphor and a polymer resin to form a stimulable phosphor layer, wherein the polymer resin comprises a polymer having a glass transition point of not more than 5° C. and not less than −30° C. and the polymer accounts for at least 50 weight % of the polymer resin in the stimulable phosphor layer;

(b) drying the stimulable phosphor layer; and (c) subjecting the stimulable phosphor layer on the support to a compression treatment employing a calender roller which comes into contact with the stimulable phosphor layer to form the radiation image conversion panel, wherein the temperature of the calender roller is not less than the glass transition temperature of the polymer resin and not more than a glass transition temperature of the support.

(4) The method for preparing a radiation image conversion panel of item 1, wherein the polymer resin in the step (a) comprises a polymer having a glass transition point of not more than 5° C. and not less than −30° C. and the polymer accounts for at least 50 weight % of the polymer resin in the stimulable phosphor layer; and the temperature of the calender roller in the step (c) is not less than the glass transition point of the polymer resin and not more than a glass transition point of the support.

(5) The method for preparing a radiation image conversion panel of item 2, wherein the polymer resin in the step (a) comprises a polymer having a glass transition point of not more than 5° C. and not less than −30° C. and the polymer accounts for at least 50 weight % of the polymer resin in the stimulable phosphor layer; and the temperature of the calender roller in the step (c) is not less than the glass transition point of the polymer resin and not more than a glass transition point of the support.

(6) The method for preparing a radiation image conversion panel of item 1, wherein the compression treatment in the step (c) is carried out at a pressure of 500 to 5,000 N/cm and at a temperature of 50 to 150° C.

(7) The method for preparing a radiation image conversion panel of item 2, wherein the compression treatment in the step (c) is carried out at a pressure of 500 to 5,000 N/cm and at a temperature of 50 to 150° C.

(8) The method for preparing a radiation image conversion panel of item 3, wherein the compression treatment in the step (c) is carried out at a pressure of 500 to 5,000 N/cm.

(9) The method for preparing a radiation image conversion panel of item 1, wherein the calender roller in the step (c) has a center-line mean surface roughness Ra of 0.05 to 3 $\mu$m.

(10) The method for preparing a radiation image conversion panel of item 2, wherein the calender roller in the step (c) has a center-line mean surface roughness Ra of 0.05 to 3 $\mu$m.

(11) The method for preparing a radiation image conversion panel of item 3, wherein the calender roller in the step (c) has a center-line mean surface roughness Ra of 0.05 to 3 $\mu$m.

(12) The radiation image conversion panel prepared according to the method of item 1.

(13) The radiation image conversion panel prepared according to the method of item 2.

(14) The radiation image conversion panel prepared according to the method of item 3.

(15) The radiation image conversion panel of item 12, wherein the stimulable phosphor incorporated in the stimulable phosphor layer is an Eu added BaFI compound.

(16) The radiation image conversion panel of item 13, wherein the stimulable phosphor incorporated in the stimulable phosphor layer is an Eu added BaFI compound.

(17) The radiation image conversion panel of item 14, wherein the stimulable phosphor incorporated in the stimulable phosphor layer is an Eu added BaFI compound.

(18) A method for capturing a radiation image, which comprises the steps of:

(a) irradiating the radiation image conversion panel of item 12 from the support side of the radiation image conversion panel with X-ray which passes through an object being diagnosed so that to store a radiation energy;

(b) stimulating the stimulable layer with an electromagnetic wave to produce stimulated luminescence; and (c) reading the stimulated luminescence from the stimulable phosphor layer side.

(19) A method for capturing a radiation image, which comprises the steps of:

(a) irradiating the radiation image conversion panel of item 13 from the support side of the radiation image conversion panel with X-ray which passes through an object being diagnosed so that to store a radiation energy;

(b) stimulating the stimulable layer with an electromagnetic wave to produce stimulated luminescence; and (c) reading the stimulated luminescence from the stimulable phosphor layer side.

(20) A method for capturing a radiation image, which comprises the steps of:

(a) irradiating the radiation image conversion panel of item 14 from the support side of the radiation image conversion panel with X-ray which passes through an object being diagnosed so that to store a radiation energy;

(b) stimulating the stimulable layer with an electromagnetic wave to produce stimulated luminescence; and (c) reading the stimulated luminescence from the stimulable phosphor layer side.

DETAILED DESCRIPTION OF THE INVENTION

The present invention will now be detailed.

The item (1) of the present invention is characterized in that a phosphor sheet, which has been coated with a stimulable phosphor layer (hereinafter occasionally referred simply to as a phosphor layer) and dried, is subjected to a compression treatment employing calender rollers; and said calender rollers, which come into contact with said stimulable phosphor layer, is comprised of a resin, and the Shore D hardness of its surface is from 80 to 97 degrees. Said calender rollers are preferably composed of polyester.

The compression treatment of the phosphor sheet, as described in the present invention, refers to the treatment described below. A stimulable phosphor layer is applied onto a subbed or non-subbed support and subsequently dried at desired conditions to form a stimulable phosphor layer, whereby a phosphor sheet is prepared. Subsequently, the resultant phosphor sheet is treated, for example, under the application of heat and pressure between a highly smoothened 1 to 100 cm diameter nip roller and a roller, which can be heated, facing said nip roller. By applying the compression treatment as above to said phosphor sheet, the stimulable phosphor filling ratio in said stimulable phosphor layer can be enhanced so that the luminance of emitted light can be increased, as well as enhancing the sharpness. In addition, by suitably selecting the calender roller materials, described below, the crown length, the pressure and temperature conditions, it is possible to achieve high uniformity of the phosphor sheet during compression treatment.

Compression methods employing said calender rollers are not particularly limited. It may be possible to employ any of the methods described in "Jushi Kakoh-gijutsu Handbook (Handbook of Resin Processing Technology (edited by Kohbunshi Gakkai, Polymer Society)", edited by Nikkan Kogyo Shinbun Co., published on Jun. 12, 1965.

Figure 1:
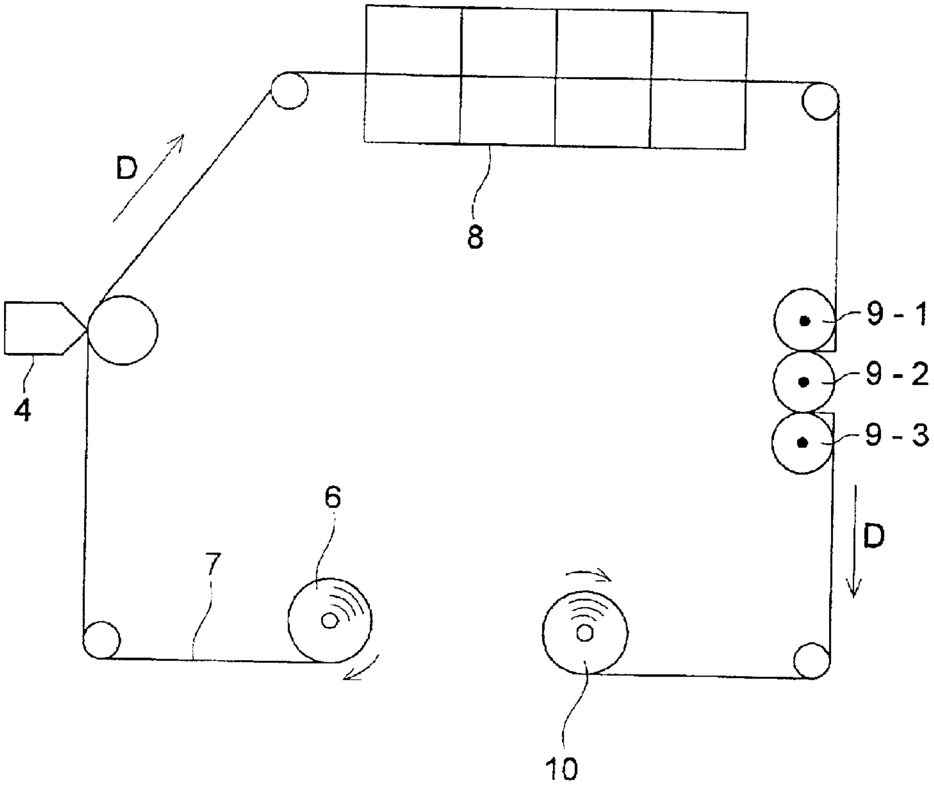
FIG. 1 is a schematic view showing one example of the embodiment of the compression treatment according to the present invention.

FIG. 1 shows one example of the embodiments of the compression treatment according to the present invention.

In FIG. 1, a stimulable phosphor layer coating composition is applied onto support 7, fed out in the conveyance direction from supply roller 6, employing coater 4. Thereafter the resulting coating is conveyed into drying zone 8 and dried employing a heated airflow from nozzles arranged on the upper and lower sides of said coating. Subsequently, support 7 (hereinafter occasionally referred to as a phosphor sheet), which has been coated with said stimulable phosphor layer and dried, is subjected to a compression treatment employing a combination of calender rollers 9-1 through 9-3, and is wound onto winding roller 10. Calender rollers are preferably comprised of calender roller 9-1, compliant roller 9-2 composed of resin, and heating roller 9-3.

In the invention according to item (1), one of the features is that the surface of the calender roller, which comes into contact with said phosphor layer, is comprised of resin of a Shore D hardness of D80 to D97 degrees and more preferably from D90 to D95 degrees.

Shore D hardness can be measured with JIS spring hardness tester (Durometer) Type D. The measuring method is described in ISO 868, ISO 7619 and JIS K7215.

The structures and types of resin of said calender roller are not particularly limited. Listed as an example may be a roller having such a configuration such that the circumferential surface of a highly rigid iron base body as an interior core is covered with, for example, an exterior cylinder made of a hard resin. Specifically listed may be Eraglass (manufactured by Kinyo Kinzoku Co.) and Mirrortex Roll (manufactured by Yamanouchi Gomu Co.).

The structures and types of resin of said calender roller are not particularly limited, as long as its surface is covered with a resin having a Shore D hardness of D80 to D97 degrees. Listed as an example may be a roller having such a configuration that the circumferential surface of a highly rigid iron base body as an interior core is covered with, for example, an exterior cylinder made of hard resin. Specifically, listed may be Eraglass (manufactured by Kinyo Kinzoku Co.) and Mirrortex Roll (manufactured by Yamanouchi Gomu Co.).

The Shore D Hardness (HS) of resin materials in the present invention can be measured employing commercially available apparatus. One of examples of such apparatus is a rubber-plastic hardness tester Asker Type D (manufactured by Kohbunshi Keiki Co., Ltd.).

The invention according to item (2) is characterized in that the crown value (or length) of the central portion of the calender roller with respect to both ends of said roller which comes into contact with the stimulable phosphor layer is from 10 to 1,000 μm. Said crown length is preferably from 50 to 300 μm. The crown value (or length), as described in the present invention, refers to an increase in height of the central portion of the roller, and specifically refers to the diameter difference (in μm) between the central portion and the end of the roller. In the present invention, by specifying the crown length of the roller used to said range, the linear pressure along the full roller width can be kept constant so that uniformity during the compression treatment can be realized.

One of the embodiments of the present invention is characterized in that a compression treatment by a calender roller is carried at a pressure of 500 to 5,000 N/cm (50 to 500 kg/cm) and a temperature of 50 to 150° C. Said pressure is preferably from 1 to 4 kN/cm, while said temperature is preferably from 50 to 100° C. By carrying out said compression treatment under conditions specified as above, the compression ratio of the stimulable phosphor layer is enhanced. As a result, the stimulable phosphor filling ratio is enhanced and high luminance, as well as excellent sharpness and graininess, can be achieved. Specifically, under said conditions, the compression ratio of the phosphor layer near the support is enhanced. As a result, effects are particularly exhibited in a method in which X-rays are irradiated onto the stimulable phosphor layer through the support of the radiation image conversion panel.

In said conditions, a sufficient compression ratio is not obtained at a linear pressure of less than 500 N/cm as well as at a temperature of less than 50° C. Further, conditions of a linear pressure of at least 5 kN/cm as well as a temperature of at least 150° C. are not preferred, since a decrease in luminance may result due to damage to stimulable phosphor particles.

One of the embodiments of the present invention is characterized in that center-line mean surface roughness Ra of a calender roller is from 0.05 to 3 $\mu$m. Said surface roughness Ra is preferably from 0.2 to 2 $\mu$m.

The center-line mean surface roughness Ra, as described in the present invention, is defined based on JIS B 0601 Surface roughness. Namely, the center-line mean roughness Ra, as described herein, means the value, in micrometer ($\mu$m), obtained by the formula shown below, when a part of measured length L is sampled from the roughness curve in the direction of the center-line; at a cut-off value of 0.8 mm, the center-line of the sampled part is taken as the X-axis and the direction of longitudinal magnification is taken as the Y-axis; and the roughness curve is expressed by Y=f(X).

$$Ra = \frac{1}{L}\int_0^L |f(x)|\,dx$$

Listed as usable measurement apparatus may be, for example, RSTPLUS non-contact 3-dimensional minute surface shape measurement system, manufactured by Wyko Co.

In the present invention, a high filling ratio can be obtained by applying the compression treatment to said phosphor sheet employing any of the methods described above. In the present invention, the filling ratio of the total stimulable phosphors in the stimulable phosphor layer is preferably at least 55 percent. Since the upper limit is naturally limited, said ratio is more preferably from 56 to 75 percent.

In the present invention, the stimulable phosphor filling ratio in the stimulable phosphor layer can be determined as described below. The radiation image conversion panel or the protective layer of the phosphor sheet is removed, and subsequently all the stimulable phosphor layer is peeled off or is dissolved out employing organic solvents. The resultant product is collected by filtration and dried. Thereafter, in order to remove the resins on the surface, the collected product is burned at 600° C. for one hour, employing an electric furnace. Said filling ratio is then obtained based on the formula described below:

$$\text{Phosphor filling ratio}=[M/(P\times Q\times R)]\times 100 \text{ (in percent)}$$

wherein M (in g) is the weight of stimulable phosphors after burning, P (in cm) is the thickness of the phosphor layer before dissolving out, Q (in $cm^2$) is the area of the phosphor sheet employed for dissolving out, and R (in $g/cm^2$) is the specific gravity of the phosphor prior to dissolving out.

The present invention makes it possible to prepare a radiation image conversion panel which exhibited excellent smoothness as well as minimal image unevenness, utilizing the following. A polymer resin, having a glass transition point in the specified range, was used to prepare a stimulable phosphor layer. A phosphor sheet, which comprised a support having thereon said stimulable phospor layer, was subjected to a compression treatment at optimal conditions such as at least Tg of said polymer resin to at most Tg of said support, which was suitable for the aforementioned characteristics.

The present invention will now be detailed.

One feature of the invention according to item 3 is characterized in that a stimulable phosphor layer comprises a polymer resin, having a glass transition point (Tg) of −30 to 5° C., in an amount of more than or equal to 50 percent by weight of the total polymer resin in said stimulable phosphor layer. The content ratio of said polymer resin is preferably from 60 to 100 percent by weight, and is more preferably from 80 to 100 percent by weight.

The glass transition point (Tg), as described in the present invention, refers to the value obtained employing the method described in Brandrap, et al., "Polymer Handbook" pages III-139 to III-179 (Wiley and Sons Co., 1966).

When a binder is comprised of a copolymer resin, the Tg is obtained based on the following formula:

$$Tg \text{ (of copolymer) (in } ^\circ\text{ C.)}=v_1Tg_1+v_2Tg_2+\ldots+v_nTg_n$$

wherein $v_1$, $v_2$, $v_3$, . . . $v_n$ each represents the mass fraction of the monomer in the copolymer, and $Tg_1$, $Tg_2$, $Tg_3$, . . . $Tg_n$ each represents the Tg of the homopolymer prepared employing each monomer in the copolymer. The accuracy of the Tg calculated by said formula is ±5° C.

Polymer resins, which are usable binders in the present invention, are not particularly limited, and include, for example, polyurethanes, polyesters, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, cellulose derivatives (nitrocellulose), styrene-butadiene copolymers, various types of synthetic rubber, phenol resins, epoxy resins, urea resins, melamine resins, phenoxy resins, silicone resins, acryl based resins, and urea-formamide resins. Of these, polyurethanes, polyesters, and vinyl chloride based copolymers are preferably employed.

The present invention is characterized in comprising a polymer resin having a glass transition point (Tg) of −30 to 5° C. in an amount of at least 50 percent by weight based on the total polymer resins of the stimulable phosphor layer. Other polymer resins, known in the art, may be employed which exhibit characteristics other than those specified above.

In the present invention, polymer resins comprised of resins, having a hydrophilic polar group, are more preferably employed. It is assumed that the adsorption of said hydrophilic polar group onto the surface of stimulable phosphor particles improves the dispersibility of said stimulable phosphors and also minimizes the coagulation thereof, and as a result, enhances coating stability, sharpness, and graininess. Specifically, polymer resins preferably comprise at least one of the hydrophilic polar groups selected from groups consisting of $—SO_3M$, $—OSO_3M$, —COOM, $—PO(OM)_2$, and $—OPO(OM)_2$. M represent H or an alkali metal atom such as Li, K and Na.

Polyurethane preferably employed in the present invention will now be described, which is one example of resins having a hydrophilic polar group. Polyurethanes can be synthesized employing a commonly used method, such as utilizing a reaction between polyols and polyisocyanates. Generally employed as polyol components are polyester polyols prepared utilizing a reaction between polyols and polybasic acids. By utilizing said method, polyester polyols having hydrophilic polar groups can be synthesized employing said hydrophilic polar groups as one portion of the polybasic acid.

Further, in addition to these, polyurethane UR8300 having a —$SO_3Na$ group (manufactured by Toyo Boseki Co.) and polyurethane TIM-6001 having a COOH group (manufactured by Sanyo Kasei Co.) are readily available as commercial products.

Further, vinyl chloride based resins, which are preferably employed, can be synthesized utilizing an addition reaction between copolymers having an OH group such as vinyl chloride-polyvinyl alcohol copolymers and compounds having the same hydrophilic polar group as described above and a chlorine atom.

Listed as commercially available these products are, for example, MR110 (manufactured by Nippon Zeon Co.) which is a vinyl chloride-vinyl acetate copolymer having a —$SO_3K$ group. Listed as polyesters having a —$SO_3Na$ group is Biron 330 (manufactured by Toyo Boseki Co.), and listed as polyurethane is UR-8200 having a —$SO_3Na$ group (manufactured by Toyo Boseki Co.).

Another feature of the invention according to claim 1 is that a phosphor sheet, which is prepared by applying a stimulable phosphor layer onto a support and which is subsequently dried, is subjected to a compression treatment in the temperature range of at least the Tg of the polymer resin to at most the Tg of said support, employing calender rollers.

The compression treatment of the phosphor sheet, as described in the present invention, refers to the treatment described below. A stimulable phosphor layer is applied onto a subbed or non-subbed support and subsequently dried at desired conditions to form a stimulable phosphor layer, whereby a phosphor sheet is prepared. Subsequently, the resultant phosphor sheet is treated, for example, under the application of heat and pressure between a highly smoothened 1 to 100 cmϕ nip roller and a roller, which can be heated, facing said nip roller. The first effect of the application of said compression treatment applied to said phosphor sheet is that the stimulable phosphor filling ratio in said stimulable phosphor layer can be enhanced so as to increase the luminance of emitted light as well as to improve sharpness, and the second effect is that by specifying the application conditions of pressure and heat, it is possible to obtain the high uniformity of said phosphor sheet during said compression treatment.

In the followings are described about the components of radiation image conversion panels employing stimulable phosphors the present invention. Employed as stimulable phosphors for the radiation image conversion panel are, for example, phosphors which result in stimulated luminescence in the wavelength range of 300 to 500 nm, utilizing stimulating light in the wavelength region of 400 to 900 nm.

Examples of phosphors preferably used for radiation image conversion panels of the present invention are described below. However, the present invention is not limited to these examples.

(1) Rare earth element activated alkaline earth metal fluorinated halogen phosphors represented by the composition formula of $(Ba_{1-x}, M^{II+}{}_{x})FX{:}yA$, described in Japanese Patent Publication Open to Public Inspection No. 55-12145, wherein $M^{II+}$ represents at least one of Mg, Ca, Sr, Zn, and Cd; X represents at least one of Cl, Br, and I; A represents at least one of Eu, Tb, Ce, Tm, Dy, Pr, Ho, Nd, Yb, and Er; "x" and "y" each represent figures satisfying the relationship of $0 \leqq x \leqq 0.6$ and $0 \leqq y \leqq 0.2$, respectively. Further, said phosphors may comprise additives as described in (a) through (j) below.

(a) X', BeX", $M^{III}X_3'''$, described in Japanese Patent Publication Open to Public Inspection No. 56-74175, (wherein X', X" and X''' each represent at least one of CL, Br and I; and $M^{III}$ represents a trivalent metal);

(b) metal oxides described in Japanese Patent Publication Open to Public Inspection No. 55-160078, such as BeO, BgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, and $ThO_2$;

(c) Zr and Sc described in Japanese Patent Publication Open to Public Inspection No. 56-116777;

(d) B described in Japanese Patent Publication Open to Public Inspection No. 57-23673;

(e) As and Si described in Japanese Patent Publication Open to Public Inspection No. 57-23675;

(f) M·L (wherein M represents at least one alkali metal selected from the group of Li, Na, K, Rb, and Cs; L represents at least one trivalent metal selected from the group of Sc, Y, La, Ce, Pr, Nd, Pm, Sm, Gd, Tb, Dy, Ho, Er, Tm, Yb, Lu, Al, Ga, In, and Tl) described in Japanese Patent Publication Open to Public Inspection No. 58-206678;

(g) calcined tetrafluoroboric acid compounds described in Japanese Patent Publication Open to Public Inspection No. 59-27980; calcined, univalent or divalent metal salt of hexafluorosilic acid, hexafluorotitanic acid or hexafluorozirconic acid, described in Japanese Patent Publication Open to Public Inspection No. 59-27289; NaX' (wherein X' represents at least one of Cl, Br and I), described in Japanese Patent Publication Open to Public Inspection No. 59-56479;

(h) transition metals such as V, Cr, Mn, Fe, Co, and Ni, described in Japanese Patent Publication Open to Public Inspection No. 59-56480; $M^{I}X'$, $M'^{II}X''$, $M^{III}X'''$ and A, (wherein $M^{I}$ represents at least one alkali metal selected from the group of Li, Na, K, Rb, and Cs; $M'^{II}$ represents at least one divalent metal selected from the group of Be and Mg; $M^{III}$ represents at least one trivalent metal selected from the group of Al, Ga, In, and Tl; A represents a metal oxide; X', X" and X''' each represents at least one halogen atom selected from the group of F, Cl, Br, and I), described in Japanese Patent Publication Open to Public Inspection No. 59-75200;

(i) $M^{I}X'$ (wherein $M^{I}$ represents at least one alkali metal selected from the group of Rb or Cs; and X' represents at least one halogen atom selected from the group of F, Cl, Br, and I), described in Japanese Patent Publication Open to Public Inspection No. 60-101173;

(j) $M^{II'}X'_2 \cdot M^{II'}X''_2$, (wherein $M^{II'}$ represents at least an alkaline earth metal selected from the group Ba, Sr, or Ca; X' and X" each represents at least one halogen atom selected from the group of Cl, Br, or I, and $X' \neq X''$), described in Japanese Patent Publication Open to Public Inspection No. 61-23679; and $LnX''_3$ (wherein Ln represents at least one rare earth metal selected from the group of Sc, Y, La, Ce, Pr, Nd, Pm, Sm, Gd, Tb, Dy, Ho, Er, Tm, Yb, and Lu; X" represents at least one halogen atom selected from the group of F, Cl, Br, and I), described in Japanese Patent Publication Open to Public Inspection No. 61-264084.

(2) Divalent europium activated alkaline earth metal halide phosphor represented by the composition formula of $M^{II}X_2 \cdot aM^{II}X'_2:xEu^{2+}$ (wherein $M^{II}$ represents at least one alkaline earth metal selected from the group of Ba, Sr, and Ca; X and X' each represent at least one halogen atom selected from the group of Cl, Br, and I; and X≠X'; "a" represents a figure satisfying the relationship of $0 \leqq a \leqq 0.1$ and "x" represents a figure satisfying the relationship and $0 \leqq x \leqq 0.2$), described in Japanese Patent Publication Open to Public Inspection No. 60-84381. Further, said phosphors may comprise additives as described in (a) through (e) below.

(a) $M^IX'$ (wherein $M^I$ represents at least one alkali metal selected from the group of Rb and Cs; X' represents at least one halogen atom selected from the group of F, Cl, Br, and I), described in Japanese Patent Publication Open to Public Inspection No. 60-166379;

(b) KX", $MgX_2'''$ and $M^{III}X_3''''$ (wherein $M^{III}$ is at least one trivalent metal selected from the group of Sc, Y, La, Gd, and Lu; X", X''' and X'''' each represent at least one halogen atom selected from the group of F, Cl, Br, and I), described in Japanese Patent Publication Open to Public Inspection No. 221483;

(c) B described in Japanese Patent Publication Open to Public Inspection No. 60-228592; oxides such as $SiO_2$ or $P_2O_5$, described in Japanese Patent Publication Open to Public Inspection No. 60-228593; LiX" and NaX" (wherein X" represents at least one halogen atom selected from the group of F, Cl, Br, and I), described in Japanese Patent Publication Open to Public Inspection No.61-120882;

(d) SiO described in Japanese Patent Publication Open to Public Inspection No. 61-120883; $SnX_2''$ (wherein X" is at least one halogen atom selected from the group of F, Cl, Br, and I), described in Japanese Patent Publication Open to Public Inspection No. 61-120885;

(e) CsX" and $SnX_2'''$ (wherein X" and X''' each represent at least one halogen atom selected from the group of F, Cl, Br, and I), described in Japanese Patent Publication Open to Public Inspection No. 61-235486; and CsX" and $Ln^{3+}$ (wherein X" represents at least one halogen atom selected from the group of F, Cl, Br, and I; Ln represents at least one rare earth element selected from the group of Sc, Y, Ce, Pr, Nd, Sm, Gd, Tb, Dy, Ho, Er, Tm, Yb, and Lu), described in Japanese Patent Publication Open to Public Inspection No. 61-235487.

(3) Rare earth element activated rare earth oxyhalide phosphors represented by the composition formula of LnOX:xA, (wherein Ln represents at least one of La, Y, Gd, and Lu; X represents at least one of Cl, Br, and I; A represents at least one of Ce and Tb; and "x" represents a figure satisfying the relationship of $0<x<0.1$), described in Japanese Patent Publication Open to Public Inspection No. 55-12144;

(4) Cerium activated trivalent metal oxyhalide phosphors represented by the composition formula of $M^{II}OX:xCe$, (wherein $M^{II}$ represents at least one oxidized metal selected from the group of Pr, Nd, Pm, Sm, Eu, Tb, Dy, Ho, Er, Tm, Yb, and Bi; X represents at least one of Cl, Br, and I; "x" represent a figure satisfying the relationship of $0<x<0.1$), described in Japanese Patent Publication Open to Public Inspection No. 58-69281;

(5) Bismuth activated alkali metal halide phosphors represented by the composition formula of $M^IX:xBi$, (wherein $M^I$ represents at least one alkali metal selected from the group of Rb and Cs; X represents at least one halogen atom selected from the group of Cl, Br, and I; "x" represent a figure satisfying the relationship of $0<x \leqq 0.2$), described in Japanese Patent Application No. 60-70484;

(6) Divalent europium activated alkaline earth metal halophosphate phosphors represented by the composition formula of $M^{II}_5(PO_4)_3X:Eu^{2+}$, (wherein $M^{II}$ represents at least one alkaline earth metal selected from the group of Ca, Sr, and Ba; X represents at least one halogen atom selected from the group of F, Cl, Br, and I; and "x" represents a figure satisfying the relationship of $0<x \leqq 0.2$), described in Japanese Patent Publication Open to Public Inspection No. 60-141783;

(7) Divalent europium activated alkaline earth metal haloborate phosphors represented by the composition formula of $M^{II}_2BO_3X:xEu^{2+}$ (wherein $M^{II}$ represents at least one alkaline earth metal selected from the group of Ca, Sr, and Ba; X is at least one halogen atom selected from the group of Cl, Br, and I; and "x" is a figure satisfying the relationship of $0<x \leqq 0.2$), described in Japanese Patent Publication Open to Public Inspection No. 60 157099;

(8) Divalent europium activated alkaline earth metal halophosphate phosphors represented by the composition formula of $M^{II}_2PO_4X:xEu^{2+}$, (in which $M^{II}$ represents at least one alkaline earth metal selected from the group of Ca, Sr, and Ba; X represents at least one halogen atom selected from the group of Cl, Br, and I; and "x" represents a figure satisfying the relationship of $0<x \leqq 0.2$), described in Japanese Patent Publication Open to Public Inspection No. 60-157100;

(9) Divalent europium activated alkaline earth metal hydrogenated halide phosphors represented by the composition formula of $M^{II}HX:xEu^2$ (wherein $M^{II}$ represents at least one alkaline earth metal selected from the group of Ca, Sr, and Ba; X represents at least one halogen atom selected from the group of Cl, Br, and I; and "x" represents a figure satisfying the relationship of $0<x \leqq 0.2$), described in Japanese Patent Publication Open to Public Inspection No. 60-217354;

(10) Cerium activated rare earth composite halide phosphors represented by the composition formula of $LnX_3.aLn'X_3':xCe^{3+}$, (wherein Ln and Ln' each represent at least one rare earth element selected from the group of Y, La, Gd, and Lu; X and X' each represents at least one halogen atom selected from the group of F, Cl, Br, and I; X≠X'; "a" represents a figure satisfying the relationship of $0<a \leqq 10.0$; and "x" represents a figure satisfying the relationship of $0<x \leqq 0.2$), as described in Japanese Patent Publication Open to Public Inspection No. 61-21173;

(11) Cerium activated rare earth composite halide phosphors represented by the composition formula of $LnX_3.aM^IX':xCe^{3+}$ (wherein Ln represents at least one rare earth element selected from the group of Y, La, Gd, and Lu; $M^I$ represents at least one alkali metal selected from the group of Li, Na, K, Cs, and Rb; X and X' each represents at least one halogen atom selected from the group of Cl, Br, and I; "a" represents a figure satisfying the relationship of $0<a \leqq 10.0$; and "x" represents a figure satisfying the relationship of $0<x \leqq 0.2$), described in JP-A 61-21182;

(12) Cerium activated rare earth halophosphate phosphors represented by the composition formula of $LnPO_4.aLnX_3:xCe^{3+}$ (wherein Ln represents at least one rare earth element selected from the group of Y, La, Gd, and Lu; X represents at least one halogen atom selected from the group of F, Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. 61-40390;

(13) Divalent europium activated cesium rubidium halide phosphors represented by the composition formula of $CsX:aRbX':xEu^2$ (wherein X and X' each represents at least one halogen atom selected from the group of Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. No. 61-236888;

(14) Divalent europium activated composite halide phosphors represented by the formula of $M^{II}X_2.aM^{I}X':xEu^{2+}$ (wherein $M^{II}$ represents at least one alkaline earth metal selected from the group of Ba, Sr, and Ca; $M^{I}$ represents at least one alkali metal selected from the group of Li, Rb, and Cs; X and X' each represent at least one halogen atom selected from the group of Cl, Br, and I; "a" represents a figure satisfying the relationship of $0<a\leqq 10.0$; and "x" represents a figure satisfying the relationship of $0<x\leqq 0.2$), described in Japanese Patent Publication Open to Public Inspection No. No. 61-236890.

Of said stimulable phosphors, iodide-containing divalent europium activated alkaline earth metal fluorohalide phosphors, iodide-containing divalent europium activated alkaline earth metal halide phosphors, iodide-containing rare earth element activated rare earth oxyhalide phosphors, and iodide-containing bismuth activated alkaline metal halide phosphors are materials which result in high stimulated luminescence.

Examples used for a support of the present invention are; various types of polymer materials, glass, metals. From the viewpoint of handling information recording materials, flexible sheets or those capable of being machined into a web are suitable. From this viewpoint, preferred are plastic films such as cellulose acetate film, polyester film, polyethylene terephthalate film, polyethylene naphthalate film, polyamide film, polyimide film, triacetate film, and polycarbonate film; metal films of aluminum, iron, copper, and chromium; and metal films coated with hydrophilic fine particles.

Though the thickness of these supports varies depending on the materials used, it is generally from about 3 to about 1,000 $\mu$m, and from the viewpoint of ease of handling, it is preferably from about 80 to about 500 $\mu$m.

These supports may have a smooth surface or a matt surface to enhance adhesion with the stimulable phosphor layer.

These supports may be provided with a sublayer in order to improve the adhesion property of a stimulable phosphor layer between a surface of the support.

Examples of binders employed in said sublayer include proteins such as gelatin, polysaccharides such as dextran, natural polymers such as gum Arabic, and synthetic polymers such as polyvinyl butyral, polyvinyl acetate, nitrocellulose, ethylcellulose, vinylidene chloride-vinyl chloride copolymers, polyalkyl acrylate, polyalkyl methacrylate), vinyl chloride-vinyl acetate copolymers, polyurethane, cellulose acetate butyrate, polyvinyl alcohol, and linear polyesters. Further, these binders may be subjected to cross-linking employing bridging agents.

Examples of binders employed in said stimulable phosphor layer include compounds describe for binders of the sublayer. These binders may also be subjected to cross-linking employing bridging agents.

Preferred weight ratio of a binder to said stimulable phosphor in the coating composition varies depending on the properties and the kinds of the targeted radiation image conversion panel. Usually, the preferred weight ratio of the binder to the stimulable phosphor is 1 to 20. In order to get larger brightness and higher sharpness of the radiation image conversion panel, the amount of binder is preferably smaller, and by consideration of easiness of coating, more preferred ratio of the binder to the stimulable phosphor is 2 to 10.

Listed as examples of solvents, employed to prepare said stimulable phosphor layer 4 coating composition, are lower alcohols such as methanol, ethanol, isopropanol, and n-butanol; ketones such as acetone, methyl ethyl ketone, methyl isobutyl ketone, and cyclohexanone; esters of lower fatty acids and lower alcohols such as methyl acetate, ethyl acetate, and n-butyl acetate; ethers such as dioxane, ethylene glycol monoethyl ether and ethylene glycol monomethyl ether; aromatic compounds such as toluene and xylene; halogenated hydrocarbons such as methylene chloride and ethylene chloride; and mixtures thereof.

Further, various additives such as dispersing agents to enhance the dispersion of said stimulable phosphors in said coating composition, and plasticizers to enhance a bonding force between binders and phosphors in the resulting stimulable phosphor layer may be incorporated into said coating composition. Listed as examples of dispersing agents employed for said purpose may be phthalic acid, stearic acid, caproic acid, and oleiophilic surface active agents. Listed as examples of plasticizers are phthalic acid esters such as triphenyl phosphate, cresyl phosphate, and diphenyl phosphate; phthalic acid esters such as dimethoxyethyl phthalate; glycolic acid esters such as ethyl phthalyl ethyl glycolate and butyl phthalyl butyl glycolate; polyesters of polyethylene glycol with aliphatic dibasic acids such as polyester of triethylene glycol with adipic acid and polyester of diethylene glycol with succinic acid.

A stimulable phosphor layer coating composition is prepared employing any of the common homogenizers such as a ball mill, a sand mill, an attritor, a three-pole mill, a high-speed impeller homogenizer, a Kady mill, and an ultrasonic homogenizer.

The coating composition prepared as above is uniformly coated onto the surface of the sublayer, whereby a coating composition layer is formed. Said coating is carried out employing conventional coating means such as a doctor blade, a roll coater, a knife coater, a comma coater, and a lip coater. The resulting coating is dried through gradual heating, whereby the formation of said stimulable phosphor layer 4 on the sublayer is completed.

The thickness of said stimulable phosphor layer varies depending on the target characteristics of the radiation image conversion panel, the types of stimulable phosphors, and the mixing ratio of binders to stimulable phosphors. However, said thickness is preferably in the range of 10 to 1,000 $\mu$m, and is more preferably in the range of 10 to 500 $\mu$m.

A phosphor sheet, prepared by applying the stimulable phosphor layer onto a support, is then cut into specified sizes. Any of several common methods may be employed for cutting. However, from the viewpoint of workability as well as accuracy, trimming machines or punching machines are preferred.

The radiation image conversion panel of the present invention is preferably provided with a protective layer (hereinafter occasionally referred to as a protective film) in order to chemically and physically protect the surface of the stimulable phosphor layer. Said protective layer may be suitably constituted based on its purposes as well as its use.

Examples of protective layers to cover said stimulable phosphor layer may be polyester film, polymethacrylate film, nitrocellulose film, and cellulose acetate film, provided with a stimulating light absorbing layer at a haze ratio of 5 to 60 percent, determined by the method described in ASTMD-1003. Of these, from the viewpoint of transparency as well as strength, stretched films such as polyethylene terephthalate film and polyethylene naphthalate film are preferred, and from the aspect of moisture resistance, metalized films are specifically preferred, which are obtained by applying a thin layer comprised of metal oxides or silicone nitride onto said polyethylene terephthalate film or polyethylene naphthalate film through vacuum evaporation.

The haze ratio to obtain the effects of the present invention is preferably from 5 to 60 percent, and is more preferably from 10 to 50 percent. A haze ratio of less than 5 percent is not preferred, since effects to minimize image unevenness, as well as to minimize linear noise, decrease. On the other hand, said haze ratio of more than or equal to 60 percent is also not preferred, since sharpness enhancing effects are degraded.

In order to satisfy required moisture resistance, optimal moisture resistance is obtained by laminating a plurality of resinous films and metalized films obtained by vacuum-evaporating metal oxides onto said resinous film. In order to minimize degradation of stimulable phosphors due to moisture absorption, it is preferable to achieve no more than 50 $g/m^2$·day. The method of laminating a resinous film is not specially limited and known conventional methods can be applied.

Further, an excitation light absorbing layer is preferably provided between the laminated resinous films so that said excitation light absorbing layer is protected from physical impact as well as chemical modification so as to stabilize the plate functions over an extended period of time. In addition, said excitation light absorbing layer may be provided in a plurality of positions, and an adhesive layer for lamination may be comprised of coloring agents, thereby being utilized as the excitation light absorbing layer.

A protective film may be provided a adhesion layer between a stimulable phosphor layer. However, a structure which covers all of the stimulable phosphor surface is preferred. This structure is called a "sealed structure". When a phosphor plate is sealed employing a protective film, it is possible to employ any of the several conventionally known methods such as a phosphor sheet which is interposed between moisture resistant protective films and the peripheral edge of which is subjected to lamination under application of heat and pressure employing an impulse sealer, and lamination is carried out between rollers under application of heat and pressure. By employing a heat fusible resinous film as the resinous layer of the outermost layer in contact with the phosphor sheet of the moisture resistant protective film, the moisture resistant protective film is fused, whereby the efficiency of sealing work of the phosphor sheets is enhanced. The moisture resistant protective film is preferably provided on both sides of the phosphor sheet and the peripheral edge of said moisture resistant protective films, which is located beyond the peripheral edge of said phosphor sheet, is fused to result in a sealed structure, whereby it is possible to prevent infusion of water from the outside. Further, the moisture resistant protective film on one side of the support may be laminated with at least one aluminum film. By employing such a support, it is possible to assure minimal water infusion.

Further, said heat fusion, which is carried out employing an impulse sealer, is preferably performed under reduced pressure to minimize the displacement of the phosphor sheet in the moisture resistant protective film and to remove moisture from the atmosphere.

Still further, the phosphor surface may or may not be allowed to come into contact with the heat fusible resinous layer of the outermost layer on the side in contact with the phosphor surface of the moisture resistant protective film. The non-contact state, as described herein, refers to the state in which the phosphor surface and the moisture resistant protective film are optically and mechanically handled mostly as discontinuous body, even though they may come into "point" contact. Further, the heat fusible film, as described herein, refers to the resinous films which are fusible in the generally used impulse sealer, and include, for example, ethylene-vinyl acetate copolymers (EVA), polypropylene (PP) film, and polyethylene (PE) film. However, the present invention is not limited to these examples.

The radiation image capturing method according to one of the embodiments is characterized in X-rays are irradiated onto the stimulable phosphor layer from the support side of said radiation image conversion panel, and output image information is read from the side of said stimulable phosphor layer.

Figure 2:
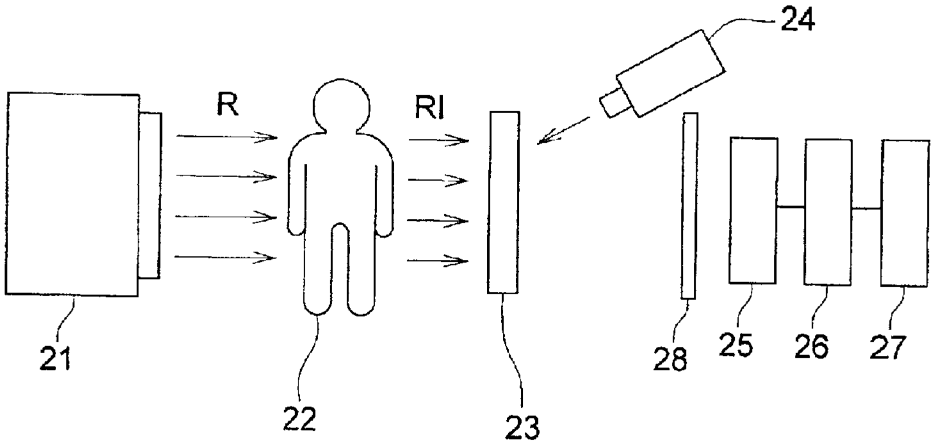
FIG. 2 is a schematic view showing one example of the radiation image conversion method employing the radiation image conversion panel according to the present invention.

FIG. 2 shows one example of a radiation image conversion method employing a radiation image conversion panel. The radiation image conversion panel of the present invention is advantageously employed based on the radiation image conversion method schematically shown in FIG. 2. Namely, in FIG. 2, numeral 21 is a radiation generating unit, 22 is the image subject, 23 is the radiation image conversion panel according to the present invention, 24 is a stimulating excitation light source, 25 is a photoelectric transfer unit which detects the stimulated luminescence emitted from said conversion panel, 26 is a unit which reproduces images based on signals detected by 25, 27 is a unit to display the reproduced images, 28 is a filter which transmits only stimulated phosphorescence upon separating said stimulating excitation light and the stimulated phosphorescence. Incidentally, units described by numerals 25 and higher are not particularly limited as above, as long as they can reproduce images based on light information from 23, utilizing any suitable method.

As shown in FIG. 2, radiation R from radiation generating unit 21 is incident (RI) onto the support side of radiation image conversion panel 23 while transmitting subject 22. The resulting incident radiation RI is absorbed by the stimulable phosphor layer of said radiation image conversion panel 23 and energy thereof is accumulated so that an accumulated image of the radiation transmission image is formed.

Subsequently, said accumulated image is excited employing a stimulating excitation light from stimulating excitation light source 24, and the accumulated energy is released as stimulated luminescence.

The intensity of said stimulated luminescence is proportional to the amount of the accumulated radiation energy. The resulting light signals are subjected to photoelectric transfer employing photoelectric transfer unit 25 such as a photomultiplier tube, and images are reproduced by image reproducing unit 26. The reproduced images are displayed onto image display unit 27. Thus, it is possible to observe the radiation transmission image of said subject.

In the system in which X-rays are incident onto the phosphor layer side and reading is carried out on the phosphor side, subject images such as a human body are present on the phosphor layer side. Therefore, reading is generally carried out at other locations utilizing a cassette type or by conveying the panel itself. Accordingly, when such a system is employed, it takes time between the imaging and the reading. As a result, it is impossible to carry out mass medical examinations during a short period of time. On the other hand, in the system described above, in which X-rays are incident on the rear side and reading is carried out on the front side, reading is immediately carried out without need for moving the panel. As a result, said system exhibits advantages in which many subjects can be imaged during a short period of time.

EXAMPLES

The present invention will now be described with reference to examples. However, the present invention is not to be construed as being limited to these examples.

Example 1

Preparation of Radiation Image Conversion Panels

Preparation of Radiation Image Conversion Panel 1

Preparation of Phosphors

The stimulable phosphor precursor of europium activated barium fluoride iodide was synthesized as follows. Charged into a reaction vessel were 2,780 ml of an aqueous $BaI_2$ solution (3.6 mol/L) and 27 ml of an aqueous $EuI_3$ solution (0.15 mol/L). While stirring, the reaction mother solution in said reaction vessel was maintained at 83° C. Subsequently, 322 ml of an aqueous ammonium fluoride solution (8 mol/liter) were poured into said mother solution employing a roller pump, whereby precipitates were formed. After pouring, the resulting precipitates underwent ripening for 2 hours, while stirring and maintaining said temperature. Subsequently, the resulting precipitates were collected through filtration, washed with ethanol, and dried, whereby europium activated barium fluoride iodide crystals were obtained. In order to minimize the variation of particle size distribution due to calcination during sintering, ultra-fine alumina particle powder was added in an amount of 0.2 percent by weight, and the resulting mixture was well stirred so that said ultra-fine alumina particle powder was uniformly adhered onto the surface of said crystals. A quartz boat was filled with the resulting mixture and calcined under an atmosphere of hydrogen gas at 850° C. for 2 hours in a tube furnace. Thereafter, the resulting product was classified, whereby europium activated barium fluoride iodide phosphor particles, having an average particle diameter of 4 μm, were prepared.

Preparation of Phosphor Layer Coating Composition

Added to a methyl ethyl ketone-toluene (1:1) solvent mixture were 100 g of the phosphor prepared as above and 16.7 g of a polyester resin (Biron 63SS, 30 percent solids, manufactured by Toyobo Co.), and the resulting mixture was dispersed employing a propeller mixer. Subsequently, the viscosity was adjusted to 25 to 30 Pa·s, whereby a phosphor layer coating composition was prepared.

Preparation of Phosphor Sheet 1

The phosphor layer coating composition prepared as above was applied onto a 250 μm thick polyethylene terephthalate support, employing a doctor blade, so as to obtain a coating width of 1,000 mm and a coating thickness of 230 μm. Thereafter, the resultant coating was dried at 100° C. for 15 minutes, whereby phosphor layer 1 was formed, which was designated as Phosphor Sheet 1.

Preparation of Phosphor Sheet 2

Phosphor Sheet 2 was prepared in the same manner as said Phosphor Sheet 1, except that after coating said phosphor layer, a compression treatment was carried out employing the method described below.

Compression Treatment of Phosphor Sheet 2

After coating and drying said phosphor layer, a compression treatment was carried out employing a group of rollers constituted as shown in FIG. 1.

A compression section was comprised of three rollers in series, and two nips were formed between heating rollers 9-1 and 9-3, and compliant roller 9-2. In addition, adjustment was carried out so that said compliant roller came into contact only with the phosphor layer forming surface.

Employed as said heating rollers 9-1 and 9-3 were ones having a diameter of 300 mmϕ and a surface of 0.2S. Employed as said compliant roller 9-2 was polyester Mirrortex Roll (manufactured by Yamauchi Gomu), having a diameter of 250 mmϕ, a Shore D hardness of D75 degrees, a crown length of 0 μm, and a center-line mean surface roughness Ra of 0.4 μm, specified by JIS B 0601. Further, said compression treatment was carried out in such a manner that the temperature of said heating rollers was set at 70° C. and the linear pressure was adjusted to 1 kN/cm.

Preparation of Phosphor Sheets 3 through 18

Phosphor Sheets 3 through 18 were prepared in the same manner as Phosphor Sheet 2, except that the Shore hardness, materials, the center-line mean surface roughness Ra, the crown length, and compression conditions (heating temperature and linear pressure) of said compliant roller were varied as described in Table 1.

TABLE 1

| | | Characteristics of Compliant Roller | | | | Compression Condition | | |
|---|---|---|---|---|---|---|---|---|
| Radiation Image Conversion Panel No. | Compression Treatment | Roller Hardness (in degrees) | Roller Material | Surface Roughness (in μm) | Crown Length (in μm) | Temperature (in ° C.) | Linear Pressure (in kN/cm) | Remarks |
| 1 | not carried out | — | — | — | — | — | — | Comp. |
| 2 | carried out | 75 | polyester resin | 0.4 | 0 | 70 | 1 | Comp. |
| 3 | carried out | 85 | polyester resin | 0.3 | 0 | 70 | 1 | Comp. |
| 4 | carried out | 90 | polyester resin | 0.3 | 0 | 70 | 1 | Comp. |
| 5 | carried out | 95 | polyester resin | 0.2 | 0 | 70 | 1 | Inv. |
| 6 | carried out | 99 | polyester resin | 0.2 | 0 | 70 | 1 | Comp. |
| 7 | carried out | 100 or more | steel | 0.05 | 0 | 70 | 1 | Comp. |

TABLE 1-continued

| Radiation Image Conversion Panel No. | Compression Treatment | Characteristics of Compliant Roller: Roller Hardness (in degrees) | Roller Material | Surface Rough-ness (in $\mu$m) | Crown Length (in $\mu$m) | Compression Condition: Temper-ature (in ° C.) | Linear Pressure (in kN/cm) | Remarks |
|---|---|---|---|---|---|---|---|---|
| 8 | carried out | 75 | polyester resin | 0.3 | 0 | 40 | 1 | Inv. |
| 9 | carried out | 75 | polyester resin | 0.3 | 0 | 140 | 1 | Inv. |
| 10 | carried out | 75 | polyester resin | 0.3 | 0 | 160 | 1 | Inv. |
| 11 | carried out | 75 | polyester resin | 0.3 | 0 | 70 | 0.4 | Inv. |
| 12 | carried out | 75 | polyester resin | 0.3 | 0 | 70 | 2.5 | Inv. |
| 13 | carried out | 75 | polyester resin | 0.3 | 0 | 70 | 3.5 | Inv. |
| 14 | carried out | 75 | polyester resin | 0.3 | 5 | 70 | 1 | Inv. |
| 15 | carried out | 75 | polyester resin | 0.3 | 30 | 70 | 1 | Inv. |
| 16 | carried out | 75 | polyester resin | 0.3 | 150 | 70 | 1 | Inv. |
| 17 | carried out | 75 | polyester resin | 0.3 | 800 | 70 | 1 | Inv. |
| 18 | carried out | 75 | polyester resin | 0.3 | 1300 | 70 | 1 | Inv. |

Inv.: Present Invention, Comp.: Comparative Example

Preparation of Moisture Resistant Protective Film

Employed as a protective film on the phosphor layer coated side of phosphor sheets 1 through 18, prepared as above, was one comprised of Configuration (A) described below.

Configuration (A)

NY15///VMPET12///VMPET12///PET12///CPP20

NY: nylon

PET: polyethylene terephthalate

CPP: casting polypropylene

VMPET: alumina vacuum-evaporated PET (being a commercially available product, manufactured by Toyo Metalizing Co.)

The numeral shown following each resinous film is the thickness (in $\mu$m) of each resinous layer.

Said "///" refers to a dry lamination adhesion layer in which the thickness of the coloring agent layer is 3.0 $\mu$m. Employed as an adhesive for said dry lamination was a 2-liquid reaction type urethane based adhesive.

Further, employed as a protective film on the rear surface of the support of the phosphor sheet was a dry laminate film composed of a CPP 30 $\mu$m/aluminum film 9 $\mu$m/polyethylene terephthalate (PET) 188 $\mu$m. Further, in said configuration, the thickness of the adhesive layer was 1.5 $\mu$m and a 2-liquid reaction type urethane based adhesive was employed.

Preparation of Radiation Image Conversion Panel

Each of Phosphor Sheets 1 through 18 was cut into 20×20 cm square sheets. Subsequently, the periphery of the resultant sheet was fuse-sealed with the moisture resistant protective film prepared as above under reduced pressure, employing an impulse sealer, whereby radiation image conversion panels 1 through 18 were prepared. Incidentally, fusing was carried out so that the distance from the fused section to the periphery of said phosphor sheet was 1 mm. A 3 mm wide impulse heater was employed for said fusing.

Evaluation of Radiation Image Conversion Panels

Employing each of the radiation image conversion panels or the phosphor sheets prepared as above, the filling ratio, the luminance, and the sharpness, as well as its fluctuation, were evaluated based on the methods described below.

Measurement of Phosphor Filling Ratio

The protective layer of each phosphor sheet was peeled off and removed. Subsequently, employing methyl ethyl ketone, the phosphor layer was peeled off or dissolved out, filtered and dried. The resultant phosphor was burned at 600° C. for one hour employing an electric furnace, so as to remove the surface resin on the phosphor. The phosphor filling ratio was then calculated based on the formula described below.

$$\text{Phosphor filling ratio}=[M/(P\times Q\times R)]\times 100 \text{ (in percent)}$$

wherein M is the weight (in g) of the phosphor; P is the thickness (in cm) of the phosphor layer; Q is the area (in $cm^2$) of the phosphor sheet which was employed to dissolve out the phosphor; and R is the specific gravity (in $g/cm^2$) of the phosphor.

Evaluation of Luminance

The luminance of each of the radiation image conversion panels was determined based on the method described below.

Said luminance was determined as described below. In regard to each of the radiation image conversion panels, the rear surface of the support of the phosphor sheet was exposed to X-rays at a tube voltage of 80 kVp. Thereafter, said panels were subjected to excitation by operating a He-Ne laser beam (633 nm). A stimulated luminescence, emitted from the phosphor layer, was received by a light receiving unit (being a photomultiplier tube, having a spectral sensitivity of S-5), and the intensity was measured. The resultant intensity was defined as luminance, which was expressed utilizing a relative value when the luminance of said Radiating Image Conversion Panel 1 was deemed to be 100.

Evaluation of Sharpness

Said sharpness was determined as described below. In regard to each of the radiation image conversion panels, the rear surface of the support of the phosphor sheet was exposed to X-rays at a tube voltage of 80 kVp through a lead MTF chart. Thereafter, said panel was subjected to excitation by operating a He-Ne laser beam. Stimulated luminescence, emitted from the phosphor layer, was received by the same light receiving unit, as described above, and was converted into electrical signals, which were subjected to analogue/digital conversion and recorded onto a magnetic tape. Information on the resultant magnetic tape was analyzed utilizing a computer, and the modulation transfer function (MTF) in 1 cycle/mm of an X-ray image recorded in said magnetic tape was examined. Said measurement was carried out at 25 positions on said radiation image conversion panel. The resultant average (being the average MTF) was defined as sharpness, which was expressed utilizing a relative value, when the sharpness of Radiation Image Conversion panel 1 was deemed to be 100.

Evaluation of Sharpness Fluctuation

In the 1,000 mm wide length of the compliant roll employed for the preparation, 25 positions were randomly chosen, and the MTF of each position was determined based on the same method as said sharpness evaluation method. The maximum and minimum values were obtained from the resultant MTF values, and the sharpness fluctuation was calculated based on the formula shown below.

Sharpness fluctuation=(maximum MTF value−minimum MTF value/average MTF value (in percent)

Table 2 shows the obtained results.

TABLE 2

| Radiation Image Conversion Panel No. | Evaluation Result: Filling ratio (in %) | Relative Luminance | Relative Sharpness | Sharpness Fluctuation (in %) | Remarks |
|---|---|---|---|---|---|
| 1 | 52 | 100 | 100 | 2.5 | Comp. |
| 2 | 54 | 100 | 102 | 5.3 | Comp. |
| 3 | 59 | 102 | 106 | 1.3 | Inv. |
| 4 | 61 | 102 | 112 | 1.0 | Inv. |
| 5 | 63 | 103 | 113 | 1.4 | Inv. |
| 6 | 63 | 93 | 113 | 3.4 | Comp. |
| 7 | 65 | 88 | 114 | 4.7 | Comp. |
| 8 | 55 | 100 | 105 | 1.9 | Inv. |
| 9 | 62 | 102 | 113 | 1.1 | Inv. |
| 10 | 62 | 102 | 112 | 1.7 | Inv. |
| 11 | 56 | 100 | 105 | 1.5 | Inv. |
| 12 | 64 | 100 | 114 | 1.0 | Inv. |
| 13 | 65 | 99 | 115 | 1.8 | Inv. |
| 14 | 61 | 102 | 112 | 0.9 | Inv. |
| 15 | 62 | 102 | 113 | 0.7 | Inv. |
| 16 | 62 | 102 | 111 | 0.4 | Inv. |
| 17 | 61 | 102 | 112 | 0.8 | Inv. |
| 18 | 61 | 102 | 112 | 1.1 | Inv. |

Inv.: Present Invention, Comp.: Comparative Example

As can clearly be seen from Table 2, it was confirmed that by carrying out a compression treatment, employing a compliant roller having a crown length as well as having a Shore hardness according to the present invention, it was possible to enhance the stimulable phosphor filling ratio to achieve high luminance as well as high sharpness, and in addition, to decrease the sharpness fluctuation of the radiation image conversion panels. Further, it was revealed that by providing the conditions specified in claims 3 and 4 of the present invention, said effects were further enhanced.

Example 201

Preparation of Radiation Image Conversion Panels

Preparation of Radiation Image Conversion Panel 1

Preparation of Phosphors

The stimulable phosphor precursor of europium activated barium fluoride iodide was synthesized as follows. Charged into a reaction vessel were 2,780 ml of an aqueous $BaI_2$ solution (3.6 mol/L) and 27 ml of an aqueous $EuI_3$ solution (0.15 mol/L). While stirring, the reaction mother solution in said reaction vessel was maintained at 83° C. Subsequently, 322 ml of an aqueous ammonium fluoride solution (8 mol/liter) were added to said mother solution employing a roller pump, whereby precipitates were formed. After the addition, the resulting precipitates underwent ripening for 2 hours while stirred at the stated temperature. Subsequently, the resulting precipitates were collected through filtration, washed with ethanol, and dried, whereby europium activated barium fluoride iodide crystals were obtained. In order to minimize variation of particle size distribution due to calcination during sintering, ultra-fine alumina powder particles were added in an amount of 0.2 percent by weight, and the resulting mixture was well stirred so that said ultra-fine alumina powder particles were uniformly adhered onto the surface of said crystals. A quartz boat was filled with the resulting mixture and calcined under an atmosphere of hydrogen gas at 850° C. for 2 hours in a tube furnace. Thereafter, the resulting product was classified, whereby europium activated barium fluoride iodide phosphor particles, having an average particle diameter of 4 $\mu$m, were prepared.

Preparation of Phosphor Layer Coating Composition

Added to a methyl ethyl ketone-toluene (1:1) solvent mixture were 100 g of the phosphor prepared as above, and 16.7 g of a polyester resin (30 percent solids)having a Tg of 45° C., and the resulting mixture was dispersed employing a propeller mixer. Subsequently, the viscosity was adjusted to 25 to 30 Pa·s, whereby a phosphor layer coating composition was prepared.

Preparation of Phosphor Sheet 1

The phosphor layer coating composition prepared as above was applied, employing a doctor blade, onto a 250 $\mu$m thick polyethylene terephthalate support having a Tg of 69° C. so as to obtain a coating width of 1,000 mm and a coating thickness of 230 $\mu$m. Thereafter, the resultant coating was dried at 100° C. for 15 minutes, whereby phosphor layer 1 was formed. Thereafter, the coating was subjected to compression treatment employing the method described below, whereby Phosphor Sheet 1 was prepared.

Compression Treatments

After coating and drying said phosphor layer, compression treatment was carried out employing a group of rollers constituted as shown in FIG. 1.

A compression section was comprised of three rollers in series, and two nips were formed between heating rollers 9-1 and 9-2, and compliant roller 9-2. In addition, adjustment was carried out so that said compliant roller came into contact only with the phosphor layer forming surface.

Employed as said heating rollers 9-1 and 9-3 were ones having a diameter of 300 mmϕ and a surface of 0.2S. Employed as said polyester compliant roller 9-2 was Mirrortex Roll (manufactured by Yamauchi Gomu), having a diameter of 250 mmϕ, a hardness of Shore D 75 degrees, and a center-line mean surface roughness Ra of 0.4 $\mu$m, specified by JIS B 0601. Further, said compression treatment was carried out in such a manner that the temperature of said heating rollers was set at 40° C. and the linear pressure was adjusted to 1 kN/cm.

Preparation of Phosphor Sheets 2 Through 12

Phosphor Sheets 2 through 12 were prepared in the same manner as Phosphor Sheet 1, except that the types (Tg was 10° C., 5° C., −20° C., and −40° C.) and compression conditions (applied pressure, temperature, and linear pressure) were varied to those described in Table 201.

Preparation of a Moisture Resistant Protective Film

Employed as a protective film on the phosphor layer coated side of Phosphor Sheets 1 through 12, prepared as above, was one comprised of Configuration (A) described below.

Configuration (A)

NY15///VMPET12///VMPET12///PET12///CPP20

NY: nylon

PET: polyethylene terephthalate

CPP: casting polypropylene

VMPET: alumina vacuum-evaporated PET (being a commercially available product, manufactured by Toyo Metalizing Co.)

The numeral shown following each resinous film is the thickness (in μm) of each resinous layer.

Said "///" refers to the dry lamination adhesion layer in which the thickness of the coloring agent layer is 3.0 μm. Employed as an adhesive for said dry lamination was a 2-liquid reaction type urethane based adhesive.

Further, employed as a protective film on the rear surface of the support of the phosphor sheet was a dry laminate film composed of a 30 μm CPP/9 μm aluminum film/188 μm polyethylene terephthalate (PET). Further, in said configuration, the thickness of the adhesive layer was 1.5 μm and a 2-liquid reaction type urethane based adhesive was employed.

Preparation of Radiation Image Conversion Panel

Each of Phosphor Sheets 1 through 12 was cut into 20×20 cm square sheets. Subsequently, the periphery of the resultant sheet was fuse-sealed with the moisture resistant protective film, prepared as above, under reduced pressure, employing an impulse sealer, whereby radiation image conversion panels 1 through 18 were prepared. Incidentally, fusing was carried out so that the distance from the fused section to the periphery of said phosphor sheet was 1 mm. A 3 mm wide impulse heater was employed for said fusing.

Evaluation of Radiation Image Conversion Panels

Employing each of the radiation image conversion panels prepared as above, sharpness as well as its fluctuation and image unevenness were evaluated based on the methods described below.

Evaluation of Sharpness

Said sharpness was determined as described below. In regard to each of the radiation image conversion panels, the rear surface of the support of the phosphor sheet was exposed to X-rays at a tube voltage of 80 kVp through a lead MTF chart. Thereafter, said panel was subjected to excitation by operating a He-Ne laser beam. Stimulated luminescence, emitted from the phosphor layer, was received by the same light receiving unit, as described above, and was converted into electrical signals, which were subjected to analogue/digital conversion and recorded onto a magnetic tape. Information on the resultant magnetic tape was analyzed utilizing a computer, and the modulation transfer function (MTF) in 1 cycle/mm of an X-ray image recorded in said magnetic tape was examined. Said measurement was carried out at 25 positions on said radiation image conversion panel. The resultant average (being the average MTF) was defined as sharpness, which was expressed utilizing a relative value, when the sharpness of Radiation Image Conversion Panel 1 was deemed to be 100.

Evaluation of Sharpness Fluctuation

In each of the radiation image conversion panels, 25 positions were randomly chosen, and the MTF of each position was determined based on the same method as said sharpness evaluation method. The maximum and minimum values were obtained from the resultant MTF values, and the sharpness fluctuation was calculated based on the formula shown below.

$$\text{Sharpness fluctuation} = (\text{maximum } MTF \text{ value} - \text{minimum } MTF \text{ value}) / \text{average } MTF \text{ value (in percent)}$$

Table 2 shows the obtained results.

Evaluation of Image Unevenness

Each of the radiation image conversion panels was exposed to X-rays at a tube voltage of 80 kVp. Thereafter, said panel was scanned employing a He-Ne laser beam (633 nm) and then excited. Stimulated luminescence, emitted from the phosphor layer, was received by a receiving unit (a

TABLE 201

| Radiation Image Conversion Panel No. | Tg of Polymer Resin of Phosphor Layer (in ° C.) | Compression Condition Temperature (in ° C.) | Compression Condition Linear Pressure (in kN/cm) | Relative Sharpness | Sharpness Fluctuation (in %) | Image Unevenness Rank | Remarks |
|---|---|---|---|---|---|---|---|
| 1 | 45 | 40 | 1 | 100 | 3.4 | 3 | Comp. |
| 2 | 45 | 100 | 1 | 103 | 5.2 | 4 | Comp. |
| 3 | 10 | 40 | 1 | 101 | 1.9 | 2 | Comp. |
| 4 | 10 | 100 | 1 | 104 | 4.9 | 4 | Comp. |
| 5 | 5 | 40 | 1 | 109 | 0.9 | 1 | Inv. |
| 6 | −20 | — | — | 95 | 6.4 | 5 | Comp. |
| 7 | −20 | 20 | 1 | 113 | 0.4 | 0 | Inv. |
| 8 | −20 | 40 | 1 | 115 | 0.3 | 0 | Inv. |
| 9 | −20 | 100 | 1 | 116 | 4.9 | 4 | Comp. |
| 10 | −20 | 40 | 0.4 | 113 | 1.3 | 2 | Inv. |
| 11 | −20 | 40 | 6 | 116 | 1.7 | 2 | Inv. |
| 12 | −40 | 40 | 1 | impossible to evaluate due to roller adhesion during the compression treatment | | | Comp. |

Inv.: Present Invention, Comp.: Comparative Example photomultiplier having a spectral sensitivity of S-5) and was converted into electrical signals, which were reproduced as images employing an image reproduction unit and then were printed out while enlarging by a factor of two. Subsequently, the resulting prints were visually observed and the occurrence of image unevenness was evaluated. Said image unevenness was evaluated based on 6-rank from 0 to 5 according to the criteria described below.

0: no image unevenness was noticed
1: image unevenness was noticed in 1 or 2 positions on the image
2: image unevenness was noticed in 3 or 4 positions on the image
3: image unevenness was noticed in 3 or 4 positions on the image and high density image unevenness was noticed in 1 or 2 positions among them
4: image unevenness was noticed in at least 5 positions on the image
5: high density image unevenness was noticed in at least 5 positions on the image.

Table 201 also shows the obtained results as above.

As can clearly be seen from Table 201, the following was confirmed. When the stimulable phosphor layer, according to the present invention, comprised a polymer resin, having a glass transition point (Tg) of −30 to 5° C., in an amount of 50 percent by weight based on the total polymer resins of said stimulable phosphor layer, and the phosphor sheet was subjected to compression treatment in the temperature range of at least the Tg of said polymer resin to at most the Tg of the support, smoothness of said stimulable phosphor layer was improved. It was possible to obtain high sharpness and also to decrease the sharpness fluctuation as well as the image unevenness. Further, it was found that by practicing the linear pressure conditions specified in claim 2 of the present invention, the resultant effects were more pronounced.

According to the present invention, it is possible to provide a radiation panel which exhibits excellent sharpness as well as minimal image evenness, a production method thereof, and a radiation image capturing method using the same.

What is claimed is:

1. A method for preparing a radiation image conversion panel, which comprises the steps of:

(a) applying onto a support a stimulable phosphor coating composition comprising a stimulable phosphor and a polymer resin to form a stimulable phosphor layer;

(b) drying the stimulable phosphor layer; and (c) subjecting the stimulable phosphor layer on the support to a compression treatment employing a calender roller which comes into contact with the stimulable phosphor layer to form the radiation image conversion panel, wherein the calender roller has a crown value of 10 to 1,000 μm.

2. The method for preparing a radiation image conversion panel of claim 1, wherein the polymer resin in the step (a) comprises a polymer having a glass transition point of not more than 5° C. and not less than −30° C. and the polymer accounts for at least 50 weight % of the polymer resin in the stimulable phosphor layer; and the temperature of the calender roller in the step (c) is not less than the glass transition point of the polymer resin acid not more than a glass transition point of the support.

3. The method for preparing a radiation image conversion panel of claim 1, wherein the compression treatment in the step (c) is carried out at a pressure of 500 to 5,000 N/cm and at a temperature of 50 to 150° C.

4. The method for preparing a radiation image conversion panel of claim 1, wherein the calender roller in the step (c) has a center-line mean surface roughness Ra of 0.05 to 3 μm.

5. The radiation image conversion panel prepared according to the method of claim 1.

6. The radiation image conversion panel of claim 5, wherein the stimulable phosphor incorporated in the stimulable phosphor layer is an Eu added BaFI compound.

7. A method for capturing a radiation image, which comprises the steps of:

(a) irradiating the radiation image conversion panel of claim 5 from the support side of the radiation image conversion panel with X-ray which passes through an object being diagnosed so that to store a radiation energy;

(b) stimulating the stimulable layer with an electromagnetic wave to produce stimulated luminescence; and (c) reading the stimulated luminescence from the stimulable phosphor layer side.

8. A method for preparing a radiation image conversion panel, which comprises the steps of:

(a) applying onto a support a stimulable phosphor coating composition comprising a stimulable phosphor and a polymer resin to form a stimulable phosphor layer;

(b) drying the stimulable phosphor layer; and (c) subjecting the stimulable phosphor layer on the support to a compression treatment employing a calender roller which comes into contact with the stimulable phosphor layer to form the radiation image conversion panel, wherein the calender roller comprises a resin and the surface of the calender roller has a Shore D hardness of D80 to D97° and wherein the calender roller in the step (c) has a center-line mean surface roughness Ra of 0.05 to 3 μm.

9. A method for preparing a radiation image conversion panel, which comprises the steps of:

(a) applying onto a support a stimulable phosphor coating composition comprising a stimulable phosphor and polymer resin to form a stimulable phosphor layer, wherein the polymer resin comprises a polymer having a glass transition point of not more than 5° C. and not less than −30° C. and the polymer accounts for at least 50 weight % of the polymer resin in the stimulable phosphor layer;

(b) drying the stimulable phosphor layer; and (c) subjecting the stimulable phosphor layer on the support to a compression treatment employing a calender roller which comes into contact with the stimulable phosphor layer to form the radiation image conversion panel, wherein the temperature of the calender roller is not less than the glass transition point of the polymer resin and not more than a glass transition point of the support and wherein the calender roller in the step (c) has a center-line mean surface roughness Ra of 0.05 to 3 μm.

* * * * *